United States Patent [19]
Tarasevich et al.

[11] 3,994,600
[45] Nov. 30, 1976

[54] SOLID STATE STAR SCANNER

[75] Inventors: Michael Tarasevich, Bayville; Bart J. Zoltan, Emerson, both of N.J.

[73] Assignee: The Singer Company, Little Falls, N.J.

[22] Filed: Feb. 27, 1975

[21] Appl. No.: 553,526

[52] U.S. Cl. .......................... 356/152; 250/203 R; 350/6; 356/141
[51] Int. Cl.² .................................. G01B 11/26
[58] Field of Search ............... 350/6, 161; 356/141, 356/152; 250/203 R

[56] References Cited
UNITED STATES PATENTS

| | | | |
|---|---|---|---|
| 3,055,258 | 9/1962 | Hurvitz | 350/161 |
| 3,531,184 | 9/1970 | Adler | 350/161 |
| 3,661,441 | 5/1972 | Uchida et al. | 350/161 |
| 3,799,652 | 3/1974 | Torguet | 350/161 |

Primary Examiner—Maynard R. Wilbur
Assistant Examiner—S. C. Buczinski
Attorney, Agent, or Firm—T. W. Kennedy; L. A. Wright

[57] ABSTRACT

A solid state optical scanner comprising a frequency generator that vibrates a sonic transducer which in turn sets up traveling waves in an acousto-optic medium. These waves form regions of compression and rarefaction in the medium causing the medium to act as a Bragg angle grating to an incident light source. Optical lenses and a photo detector are positioned behind the medium. Consequently, the light leaving the medium is diffracted into a single order and focused onto an image plane. A photodetector is placed at the image plane and the signal obtained is processed to develop information to determine the direction from the scanner to the incident light source.

7 Claims, 3 Drawing Figures

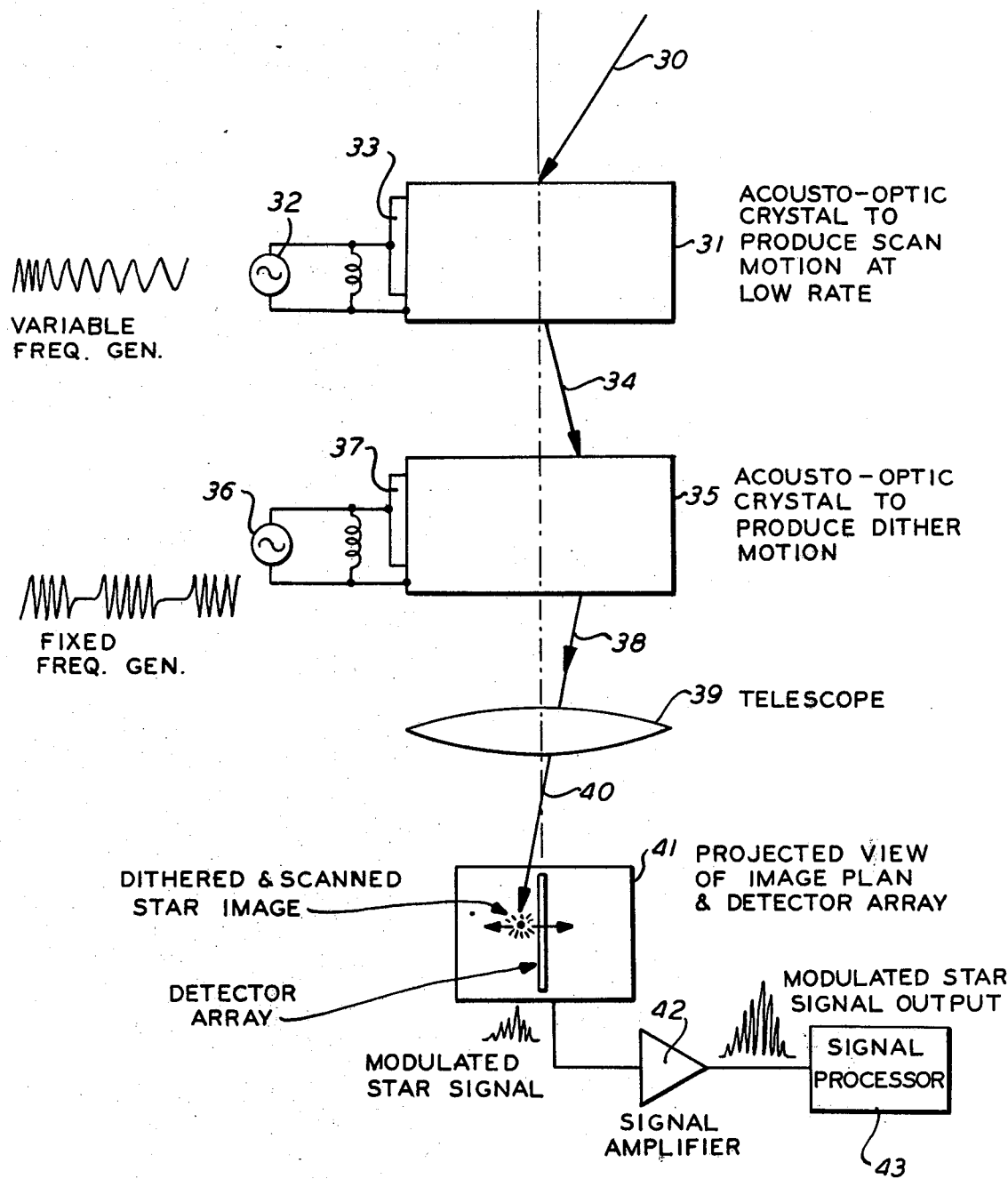

SOLID STATE STAR SCANNER

This invention is related to optical scanners. More particularly, this invention is related to a solid state optical scanner employing an acousto-optical crystal as a variable Bragg angle grating means in order to scan incident light impinging upon it.

BACKGROUND OF THE INVENTION

Conventionally, in prior art optical scanners, relative motion between the focused image of a light source such as stellar light and a photosensitive detector was accomplished by mechanical scanning methods such as taught by U.S. Pat. No. 3,015,249. This patent teaches a stellar scanner comprising a telescope with a total reflective prism pivoted about the objective lens for focusing the stellar light onto the focal plane. Scanning means provided at the focal plane modulates the image into light pulses synchronous with a reference frequency that is identical to the scanner rotation. The phase relationship between the starlight-pulses and the reference frequency is computed to provide the direction to the star image in relation to a predetemined reference on the telescope. Complex electromechanical means are employed in the invention to determine the ultimate direction to the star image. Other examples of mechanical scanner methods are disclosed in U.S. Pat. No. 2,934,824 and 3,006,236. Generally, the mechanical scanning methods taught by the prior art encompass rotating or angularly deflecting mirrors, optical wedges, translation and/or rotation of the photodetector past the stationary star image, nutating optical fibers and internal electronic scanning image tubes such as the vidicon and image dissector.

The main disadvantages of the mechanical scanner devices are relatively low frequency operation, high power consumption, poor reliability and requirement of optical encoding devices. Mechanical scanners are useful in those applications where the observation period of the light pulses is very short or where weight, size and power are not critical factors. In applications that require low power, small size and very high reliability such as long term missions as the Mars, Venus and/or planetary grand tour probes, the use of mechanical scanning devices based on mechanical motion of some portion of the optical system is precluded.

There are other disadvantages attendant upon mechanical scanner methods. For example, mirror scanning may be accompanied by mirror deformation because of severe environmental conditions which could result in a permanent loss in accuracy. In the case of the rotating optical wedge, the angular deviation of the image raised is usually small and the scan motion is restricted to a circular sweep. Modification of the wedge rotational system for an additional degree of freedom to obtain a linear sweep would lead to a very complicated highly unreliable system. The nutating optical fiber has the disadvantage of limited frequency response, small scan angle and degraded performance when subjected to vibration. Although the vidicon tube and the image dissector are characterized by very high signal-to-noise ratio, derived from the image storage capabilities, they are subject to severe disadvantages. These are high cost, poor reliability, poor radiation resistance, sensitivity to magnetic interference, sensitivity to surface temporal degradation, high power consumption, large size and the requirement of complex signal processing.

BRIEF DESCRIPTION OF THE INVENTION

In one embodiment of the present invention, an acoustooptic crystal driven by a sonic transducer and frequency generator is placed in front of the optical lens and photodetector. In this manner, stellar light impinges directly onto the acousto-optical crystal. Because of the acoustic wave in the acousto-optical crystal created by the transducer, the stellar light has a finite acceptance angle through which it may be introduced into the crystal. The acoustic waves set up in the crystal act as a Bragg angle grating to the light impinging on it. Consequently, the light leaving the crystal is diffracted into a single order, the beam angle of which may be varied and focused onto an image plane. A photodetector is placed at the image plane and the signal obtained is processed to detemine the direction to the light source.

In other embodiments of the invention two acousto-optic crystals are placed in series to produce a two-dimensional X-Y scan.

Accordingly, it is an object of this invention to provide a solid state optical scanner wherein the incident light source may be scanned over a relatively wide angle.

It is another object of this invention to provide a solid state optical scanner wherein an acousto-optical crystal is positioned ahead of the optics in order to scan a finite angle in object space before the light strikes the optical aperture.

It is another object of the invention to provide a solid state scanner that has no moving parts and that has low power consumption.

It is yet another object of this invention to provide a solid state scanner having a very high scan rate.

It is a further object of this invention to provide a solid state scanner that is unaffected by high vaccum or high vibration level environments.

It is still a further object of this invention to provide a solid state scanner having an acousto-optical crystal designed to accomodate a predetemind scan angle.

These and other objects, features and advantages of the present invention will become apparent from the following description taken in conjunction with the accompanying drawings wherein:

FIG. 3 is a schematic diagram of another embodiment of the scanner in which two acousto-optical crystals in series are individually driven by separate transducers.

The basic phenomena used in the solid state scanner of this invention involves the acousto-optical effect in solids or liquids. A manifestation of the acousto-optic effect is where a sonic wave traversing a finite transparent solid or liquid sets up a traveling wave system in the solid or liquid volume that has alternating regions of compression and rarefaction. This wave system in the medium acts as a Bragg angle grating to incident light. The grating constant due to this effect is equal to the acoustic wave length in the propagating medium (i.e., the solid or liquid volume). If a beam of monochromatic light travels through the medium in a direction approximately perpendicular to the direction of the acoustic propagation, the light beam exiting from the medium will be deviated through an angle described by the Bragg relationship:

$$n\lambda = 2d \sin \theta$$

where $\theta$ is the diffraction angle, $n$ is the order of diffraction, $\lambda$ is the acoustical wave length and $d$ is the effective grating spacing.

The acoustic wave is generated by means of a transducer bonded to one surface of the propagating medium. In order to preclude reflective waves in the system, an energy absorber (not shown) is attached to a surface opposite the transducer. In this manner reflective waves are absorbed or suppressed. Inasmuch as the effective grating spacing is the acoustical wavelength, a change in transducer drive frequency results in a change in the grating spacing or a change in the diffraction angle. If the transducer driving frequency is varied continuously over a range of frequencies the diffraction angle will change continuously over a range of diffraction angles, thereby effecting a scan motion without the use of moving parts. For a more detailed discussion, of the acousto-optical effect reference is made to Adler, R. "Interaction Between Light and South,"IEEE Spectrum pages 43–54, May, 1967 and to Lasersphere, pages 9–11, May 15, 1973.

Figure 1:
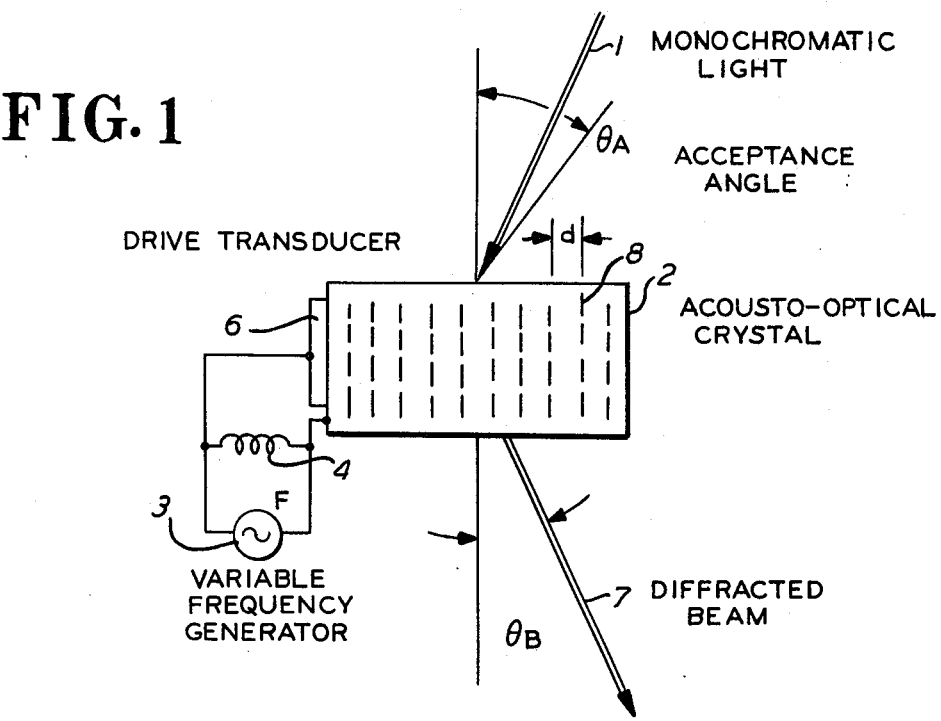
FIG. 1 is a schematic diagram showing an acousto-optical crystal driven by a transducer which sets up traveling waves in the crystal causing it to act as a Bragg angle grating to incident light.

Referring to FIG. 1, reference numeral 1 is a source of collimated monochromatic incident light which impinges on acoustooptical crystal 2 at an acceptance angle $\theta_A$. A frequency generator 3 vibrates a sonic transducer 6 which in turn sets up traveling waves in crystal 2 that are characterized by regions of compression and rarefaction. This acousto-optic effect establishes a Bragg angle grating 8 in the medium 2 to incident light 1 and the beam leaving the crystal has a diffraction angle designated $\theta_B$. The gratings 8 are spaced from each other by an amount d. Thus, the Bragg condition is:
$n\lambda = 2d \sin \theta_B$ where $\lambda$ is equal to wavelength of the incident light, $n$ is equal to the diffraction order (0, 1, 2, 3...), $\theta_A$ is equal to the acceptance angle, $\theta_B$ is equal to the diffraction angle, and d is equal to the grating spacing (or acoustic wavelength).

Since the frequency generator 3 is a variable frequency generator it can vary the traveling wave pattern set up in the crystal and thus the spacing d of the gratings. This results in variations of the diffracted beam angle which occur because the grating spacing in the crystal is directly related to the frequency of the sonic transducer driving the crystal.

While the acousto-optic effect can be observed in most materials, optimum operation of a device will be obtained by careful selection of the propagation medium to obtain maximum acoustic efficiency and maximum optical transparency. In the present invention a suitable medium is crystalline tellurium oxide (TeO$_2$), also designated as paratellurite. This material is available in highly transparent flat plates and is characterized by an unusually large acceptance angle $\theta_A$. An acoustic transducer crystal such as lithium niobate is cemented on one end of the paratellurite crystal. The transducer crystal is excited into vibration by the variable frequency oscillator and power supply. Typically, drive frequencies are in the 10MHZ region. The exact value of frequencies used depends upon the range of grating spacings and diffraction angles required. Typically, the acceptance angles $\theta_A$ for paratellurite and the maximum diffraction angle $\theta_B$ are of the order of 4° or 5°.

Figure 2:
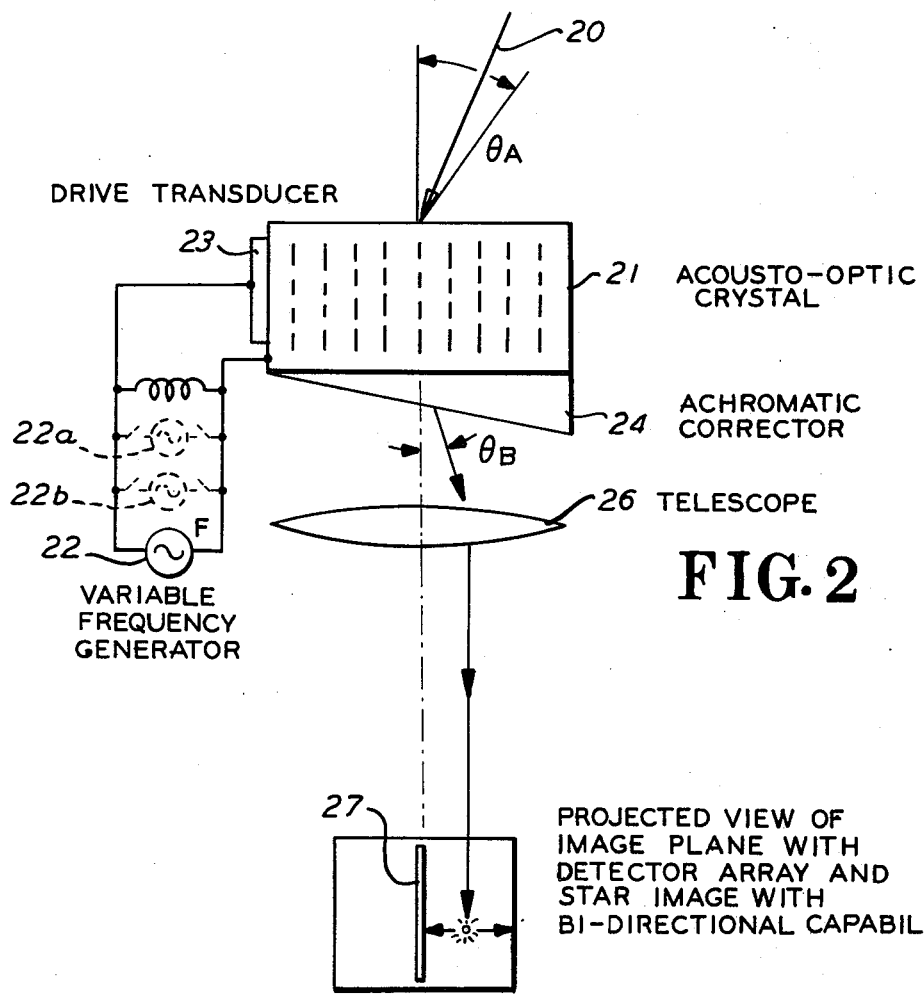
FIG. 2 is a schematic diagram similar to FIG. 1 showing in addition, the acousto-optical crystal positioned ahead of the optics and photodetector array.

In the embodiment of the invention shown in FIG. 2, the acousto-optic crystal is situated in front of the optical system and photodetector. The incident light 20 from a stellar source impinges at an acceptance angle $\theta_A$ on the acousto-optical crystal 21. The variable frequency generator 22 vibrates sonic transducer 23 which in turn sets up the traveling wave system having regions of compression and rarefaction in the acousto-optical crystal. This effect as previously stated establishes a diffraction grating in the crystal to the incident light impinging on the crystal. The light from the stellar source although collimated is not monochromatic. Thus, the beam leaving the crystal is decollimated due to the differing wavelengths of light making up the incident beam. That is, the effect of passage of the incident light through the active medium acting as a diffraction grating would be to disperse the white light into a continous spectrum so that the star image would be a diffuse band if optical correction techniques were not used. The achromatic corrector 24 positioned between the crystal and optical lens 26 recombines the spectral constitutents so that the inputs to the optical lens 26 is collimated white light deflected at the diffraction angle. The beam leaving lens 26 is focused onto photodetector array 27 situated at the image plane. The signals detected by the photodetector array are subsequently processed for determination of the angle to the incident light source as measured from a predetermined reference point. Alternately, in lieu of an achromatic corrector lens a plurality of frequency generators operative on separate wavelengths of the incident beam may be employed to recombine the spectral constituents to achieve a collimated beam of light emanating from the crystal. In this regard, the present invention provides three separate frequency generators vibrating three separate transducers to set up simultaneously wave systems which act as diffraction gratings to the separate wavelengths of the incident light beam.

Whereas, it is possible to place the acousto-optical device between the optics and the image plane, there is a unique and distinctive advantage for placement of the crystal before the optics. In the prior art, the scan devices imparted relative motion in the image plane between the star image and the detector. In the present invention, the acousto-optic medium with traveling acoustic wave excited by an external transducer has a finite optical acceptance angle through which external sources of light may be introduced into the medium. If the light is monochromatic, the light within the acceptance angle will be diffracted into a single order in a unique diffraction angle. This diffracted beam will be focused to a point in the image plane.

The range of diffracted angles available by varying the transducer frequencies can be made equal to or greater than the angular width of the acousto-optic array. When the diffraction angle is changed through its limits, the focused incident light energy will impinge upon the photodector array and a star presence signal will result after suitable electronic processing. When operated in the manner described, a finite angle in object space is scanned before the light strikes the optical aperture. If one were to trace back along the diffracted ray it becomes apparent that at each instant of time a different region in object space comes into view. This scanning method is achieved without relative physical motion between the star image and the detector and at a very high scan rate. It is impractical or impossible to scan a substantial field of view with a mirror system in the manner of the present invention because large mirrors would be required and the angular scan rate would be very small.

The basic scanner device of this invention may be incorporated into more complex systems. An example is a star scanner with modulated star signal output for use in strapped down applications where the vehicle rotates about a preferred axis to perform the scan function. The star image is chopped in the image plane by applying high frequency pulses to the active medium. As the vehicle carrying the scanner rotates, stars come onto the field of view and their images traverse the image plane. When the chopped image crosses the leading edge of a photodetector array a modulated star signal is obtained. The signal can be demodulated to achieve discrimination against background noise with a consequent increase in signal-to-noise ratio. If lower signal-to-noise ratios are acceptable, the optics can be made significantly smaller in size and weight.

In FIG. 3 a self-scan modulated star signal is obtained by placing two acoust-optic cells in series before the optics. The first cell 31 having incident light 30 impinging on it is driven by the combination of variable generator 32 and transducer 33 to produce large angle deflection 34 at a slow rate. The second cell 35 is driven at a high fixed frequency by the combination of fixed frequency generator 36 and transducer 37 to produce a small amplitude chopper of the star image via lens 39 in the image plane where photodetector array 40 is located. Thus, in a stabilized gyro platform application a star image can be scanned across a detector to produce a modulated star signal output which can be electronically processed to discriminate against background noise.

Another embodiment of the invention also employs two acousto-optical cells in series that are driven to produce a two dimensional or X-Y scan for use in star tracker applications. In this embodiment crystals 31 and 35 are oriented perpendicularly to each other so that the traveling waves set up in each crystal is also perpendicular to each other. In this manner the star image 40 can be made to execute a circular motion in the image plane where photodetector array 41, a quadrant detector, is located. The signals from the quadrants are suitably processed in amplifier 42 and signal processor 43 to produce an error signal which is fed into a platform servo (not shown) drive which torques the platform (not shown) so as to bring the error signal down to a minimum reading.

The acousto-optical deflection system of the invention can be programmed to produce an unlimited variety of scan types including random access if so desired. Turning again to FIG. 2, two axes deflection with a single cell is also contemplated as part of the invention. In this implementation of the invention, transducers are connected in pairs to the sides of the crystal at points perpendicular to each other. In this manner, traveling waves are generated in the crystal at angles perpendicular to each other furnishing an output beam which is focused onto the detector in the X-Y dimension. From the foregoing, a solid state optical scanner has been described that offers the advantages of being completely solid state with no moving parts, that has low power consumption (in the order to 50 to 100 milliwatts), that has very high scanning rate that has no requirement for motors or electro magnetic actuators, that is not effected by high vacuum or high vibration level environments and that has no requirement for optical coding devices.

Although specific embodiments of the invention have been shown and described it will be obvious to those skilled in the art that various modifications may be made without departing from the spirit of the invention which is intended to be limited solely by the appended claims.

We claim:

1. A method of scanning a predetermined area to detect a source of colliminated light therein comprising:
    a. disposing a first acousto-optical crystal such that light from the predetermined area which it is desired to scan will directly impinge on said crystal;
    b. driving said first crystal with frequency generating means so as to set up alternating regions of compression and rarefication therein;
    c. varying the frequency with which said first crystal is driven;
    d. collimating and acromatically correcting the light eminating from said first crystal; and
    e. locating detection means so as to intersect the collimated light output of said first crystal whereby said step of varying frequency will cause said first crystal to act as a Bragg angle grating to scan an input acceptance angle and the presence of a source of light therein can be detected by an output from said detection means.

2. The method of claim 1 and further including the step of focusing the light diffracted through said first crystal onto said detection means.

3. The method of claim 2 and further including the step of passing the light output of said first crystal through an additional acousto-optical crystal before focusing; driving said additional crystal at a high frequency to produce modulation of the incident light at said detector; and demodulating the output of said detector whereby the light passing through said first crystal will be modulated and by demodulating will be processed to discriminate against background noise.

4. The method of claim 1 wherein said acousto-optical crystal consists of crystalline paratellurite.

5. The method of claim 2 and further including the step of disposing a second acousto-optical crystal to intersect the light output of said first crystal before said focusing, driving said second crystal to set up therein traveling waves of alternating regions of compression and rarefications in a plane perpendicular to the plane of traveling waves in said first crystal and detecting the output through said first and second crystals in two dimensions.

6. A method of scanning a predetermined area to detect a star comprising:
    a. disposing a first acousto-optical crystal directed so that light from the area in which a star is to be detected will impinge thereon;
    b. driving said crystal in order to set up traveling waves therein;
    c. varying the frequency at which said first crystal is driven;
    d. acromatically correcting the light diffracted through siad crystal to form a collimated beam of white light; and e. focusing the light from said first crystal after correcting on a detectro, whereby the impingement of diffracted light on said detector will result in an output indicating the presence of a star within said predetermined area.

7. The method according to claim 6 and further including the step of modulating the diffracted light output of said first crystal and demodulating the output of said detector to thereby enable discrimination against background noise.

* * * * *